United States Patent [19]

Nyberg

[11] Patent Number: 5,448,851
[45] Date of Patent: Sep. 12, 1995

[54] FISHING HOOK RETAINER

[76] Inventor: Douglas W. Nyberg, 4420 3rd. Ave. South, Minneapolis, Minn. 55409

[21] Appl. No.: 300,435

[22] Filed: Sep. 2, 1994

[51] Int. Cl.[6] ............................................. A01K 97/06
[52] U.S. Cl. ................................... 43/25.2; 43/57.1
[58] Field of Search ............... 224/922, 920; 43/25.2, 43/57.1, 57.2, 54.1, 25

[56] References Cited

U.S. PATENT DOCUMENTS

| | | |
|---|---|---|
| 2,514,645 | 7/1950 | Jardine . |
| 2,525,057 | 10/1950 | Anderson ........................... 43/57.1 |
| 2,986,836 | 6/1961 | Conway . |
| 3,654,722 | 4/1972 | Camilleri ............................. 43/25 |
| 3,815,273 | 6/1974 | Perkins . |
| 3,839,811 | 10/1974 | Hopkins . |
| 4,015,361 | 4/1977 | O'Reilly et al. . |
| 4,118,882 | 10/1978 | Gorsky ................................. 43/25 |
| 4,203,245 | 5/1980 | Peterson . |
| 5,242,088 | 9/1993 | Hammond ......................... 43/25.2 |

Primary Examiner—Mark Rosenbaum
Assistant Examiner—James Miner

[57] ABSTRACT

A device for retaining a fishing hook or single hook of a fishing lure when the same is not in use. The device includes an apertured, longitudinally extending tubular member with the aperture in a side wall therof. A locking member is threadably received through one end of the tubular member and extends therein to abut with a hook received within the aperture. A single or a pair of clamps are arranged along the tubular member for attachment of the device to the rod.

7 Claims, 1 Drawing Sheet

FISHING HOOK RETAINER

FIELD OF THE INVENTION

This invention relates generally to fish hook retention devices designed for mounting on a fishing rod and more particularly to a hook retention device having an axial tubular member and an axial moveable locking member cooperating to retain a fish hook or fish hook of a lure in captured covered position.

SHORT SUMMARY OF THE INVENTION

A fish hook retention device arranged for removeable or permanent attachment to a fishing rod to retain the hook when not in use for fishing in a safe protected condition where it will not accidentally hook onto articles or persons.

The device includes means for either permanently or temporarily mounting the hook retention portion thereof onto a fishing rod with the hook retention portion arranged thereon to lie parallel to the axis of the rod and an axially moveable locking member cooperating with the retention tubular member to lock a fish hook within the cavity of the hook receiving and retention member.

Access means are provided through the side of the tubular receiving and retention member and this access area includes an enlarged portion into which the hook is placed and, selectively, a tapered end into which the hook is moved for locking of the same by a threaded rod axially moveable within the receiving and retention member. Actuation means such as an enlarged knurled head are provided on the locking device for movement of the same against the hook placed into the receiving and retention device.

BACKGROUND AND OBJECT OF THE INVENTION

The inventor and applicant of the subject matter of this invention is aware of various means and various patents issued for the retention of fish hooks and fishing lure hooks on selected portions of a fishing rod when the hook and lure are not being used. A listing of the prior art patents of which the applicant has knowledge is provided in the Prior Art Statement provided herewith. In each of these prior art situations the applicant has determined that they are not true and positive locking devices but are easily opened or easily allow the hook to be jostled or moved therefrom into a free condition. With applicant's device a positive locking arrangement is provided to insure that the unused hook or lure is not easily loosened therefrom.

Applicant provides a hook device which may be permanently mounted to a fishing rod or which is easily placed thereon during those periods when hook storage is necessary. A simple biasing connection provides a temporary attachment for connection of the hook device to a fishing rod.

The hook retention device provides an access opening into a closed hook protected area with means for positively locking the hook therein with the locking means having threads thereon such that a positive release force is required to obtain the release of the hook or lure for use.

It is therefore an object of the applicant's invention to provide a fish hook receiving and retention device which is easily placeable and removeable from the barrel or other portion of a fishing rod.

It is a further object of the applicant's invention to provide a fish hook receiving and retention device which includes the provision of a hook protective cavity area with means for locking the hook within this area to prevent accidental hooking of articles or persons when storage of the hook is intented.

It is still a further object of the applicant's invention to provide a hook receiving and retention device which includes a tubular hook receiving member having an access passage through the side thereof to receive the hook and an axially moveable locking member threadably received into the tubular member and into the cavity portion such that a hook received therein will be moved and locked against a side of the access opening by such threaded moveable member.

It is still a further object of the applicant's invention to provide a fish hook receiving and retention member providing a tubular capturing area and an access through the wall of said tubular member which access provides an enlarged hook receiving area and a tapered hook locking area with an axially moveable locking device cooperating with the receiving and retention portion to urge the hook into the tapered locking area thereof and securely hold the same therein.

These and other objects and advantages of the applicant's invention will more fully appear from a consideration of the accompanying description and drawings.

SHORT DESCRIPTION OF THE DRAWINGS

DESCRIPTION OF ONE FORM OF THE INVENTION

Figure 1:
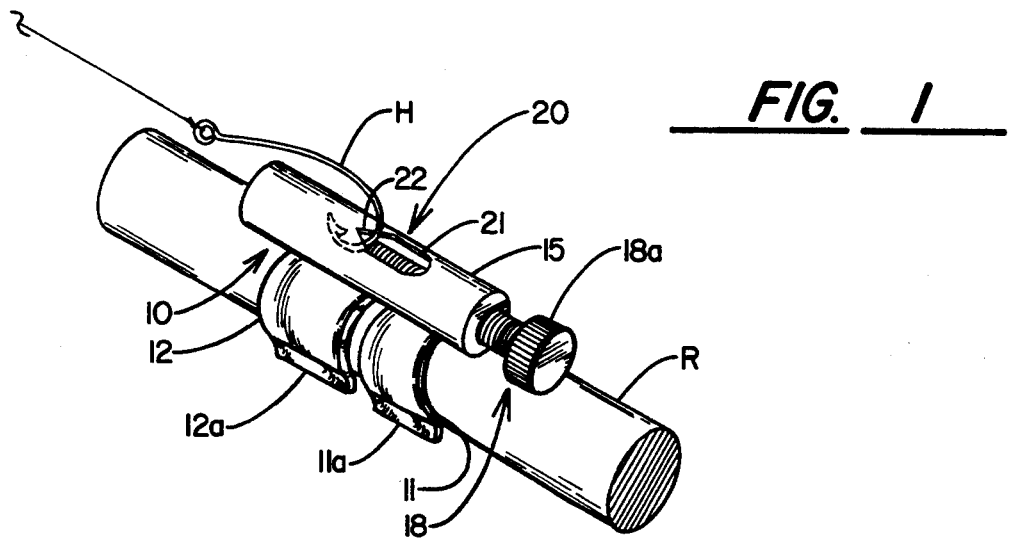
FIG. 1 is a perspective view illustrating a portion of a fishing rod to which the applicant's hook receiving and retention member has been mounted and illustrating a hook in the receiving and retention member.

In accordance with the accompanying drawings the applicant's hook retention device is generally designated 10 and is illustrated in the various views mounted on a fishing rod R and illustrating the hook H of the fish line secured therein.

The applicant's device is illustrated in these drawings as being easily placed and easily removed from a fishing rod but it should be obvious that the disclosure is not limited to such application and removal and the device 10 may be permanently attached to the rod through a variety of methods.

In accordance with the accompanying drawings a pair of partial ring members 11, 12 are provided to partially encircle the rod R and these members may be provided with entrance ears 11a, 12a which will spread outwardly upon being forced onto the rod R. Obviously the split ring concept with these ears will provide a biasing force that will hold the unit 10 onto the rod R. It should also be obvious that these elements 11, 12 may be made as a single longitudinally extending unit but the applicant has found that a pair of such members reduces the necessary force to place them onto the rod.

The hook receiving and retention portion of the unit 15 is secured to the clip or ring structure 11, 12 and consists of, in the form shown, a tubular member 16 having a closed threaded end portion 17 at one end thereof. As illustrated a locking member 18 is threadably received into the threaded passage of the end portion 17 and this threaded member is illustrated in a dotted line position for release of the hook H from the receiving and retention unit 15 for either placement of or release of the hook from such unit.

Figure 2:
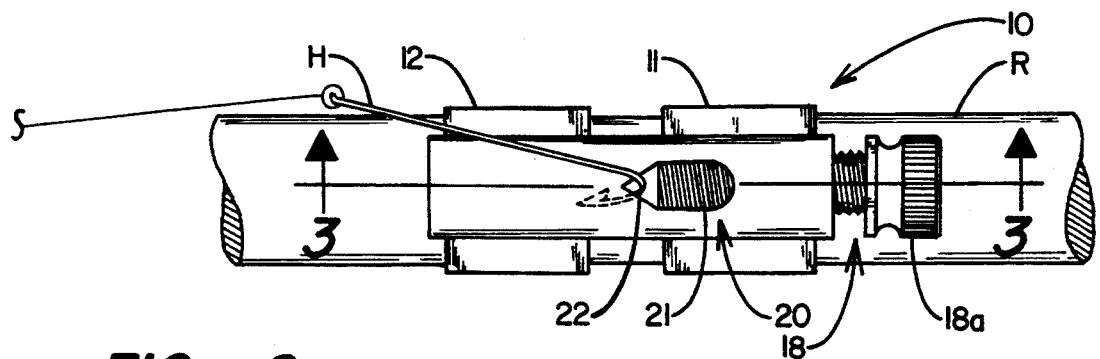
FIG. 2 is a top plan view of the unit as illustrated in FIG. 1.

Arranged through the periphery of the tubular member 16 is an access and hook receiving opening 20. As best illustrated in FIG. 2 this hook receiving aperture 20 includes a slotted portion 21 terminating in a tapered forwardly directed portion 22 which tapered portion 22 particularly serves as a confining and locking area for the hook H. The configuration of the aperture 20 acomodates hooks of various sizes and the tapered end 22 thereof will permit locking of hooks of various sizes therein.

Figure 3:
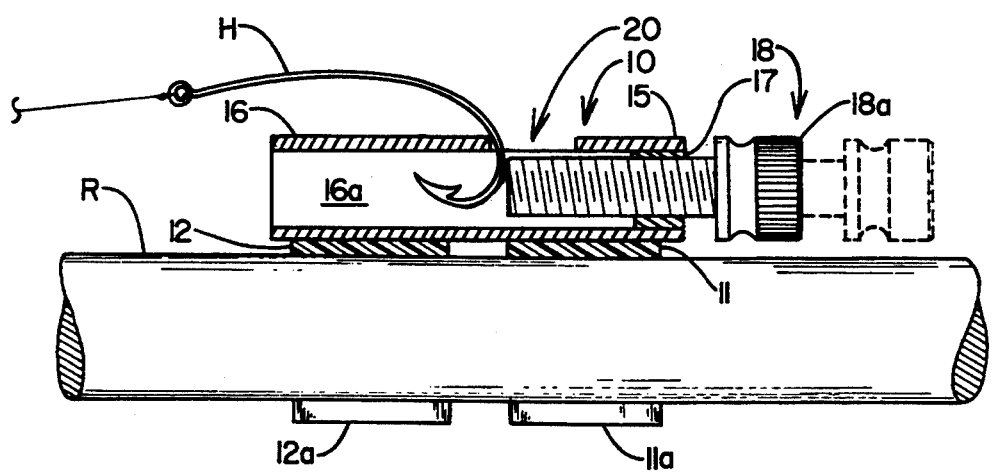
FIG. 3 is an axial section taken transversely of the unit along line 3—3 of FIG. 2 and illustrating the locking element thereof in a dotted, open position and a solid, hook locking position.

As particularly illustrated in FIG. 3 the tubular member 16 provides not only the access aperture 20 but it also provides a forwardly extending housing area 16a which will receive and retain the barbed end of the hook so as to prevent accidental hooking of the unit articles or persons. The unit then not only provides a hook receiving and retention function but also provides a safety aspect as the hook is in completely protected position.

The unit is preferrably formed of a non-metallic material to not only prevent rusting but to prevent reaction of metal to metal surfaces particularly when exposed to damp conditions.

The use of applicant's device should be obvious in that the locking member 18 is retracted to an open position such as the dotted line position of FIG. 3, the hook placed into area 16 through access opening 20 in the side of member 16 and upon rotation, locking member 18 will obviously move axially forward into locking engagement with the hook H forcing the same into the tapered area 22 of the access opening 20. As illustrated the operative locking member 18 may be provided with a knurled or enlarged end 18a to assist in movement thereof.

It should be obvious that the applicant has provided a new and unique hook receiving and retention device for use on fishing rods which is easily placed on a rod and which will effectively and safely receive and retain a plain hook or the hook of a fishing lure therein during non-use periods.

What I claim is:

1. A fishing hook retention device for mounting to a fishing rod, said retention device including:
   a. a longitudinally extending tubular body member providing a side wall;
   b. means for mounting said tubular body member axially of the fishing rod;
   c. a hook receiving opening defined in said side wall of said tubular body member in spaced relation to one end of said tubular body member; and,
   e. an axially moveable locking element in said one end of said tubular body member being axially moveable the length of said hook receiving opening, said locking element passing through a portion of said body member and a first end of said locking element extending axially outwardly of said body member from said one end of said body member, whereby a fishing hook may be received through said opening and whereby the first end of said locking element is manually adjustable such that a second end of said locking element will selectively engage the hook and lock the hook against a side of said opening.

2. The fishing hook retention device as set forth in claim 1 and said one end of said tubular body member providing a threaded passage axially thereof, said locking element being threaded for axial movement through said one end of said body member and past the length of said hook receiving opening.

3. The fishing hook retention device as set forth in claim 2 and said locking element being provided with an enlarged head portion to facilitate grasping and turning for axial movement thereof.

4. The fishing hook retention device as set forth in claim 1 and said hook receiving opening including a tapered, hook receiving and locking axial end whereby movement of said locking element forces the hook into said tapered end of said opening.

5. The fishing hook retention device as set forth in claim 1 and at least said body member of said device is formed of a non-metallic material.

6. The fishing hook retention device as set forth in claim 1 and said means for mounting said tubular body member includes biasing clamp means for placement and removal of said device to and from the fishing rod.

7. The fishing hook retention device as set forth in claim 6 and said means for mounting said tubular body member includes a pair of biasing clamp means on the respective ends of said tubular body member.

* * * * *